United States Patent [19]

Linhardt

[11] Patent Number: 4,831,817

[45] Date of Patent: May 23, 1989

[54] COMBINED GAS-STEAM-TURBINE POWER PLANT

[76] Inventor: Hans D. Linhardt, 1221 W. Pacific Coast Hwy., Newport Beach, Calif. 92663

[21] Appl. No.: 126,036

[22] Filed: Nov. 27, 1987

[51] Int. Cl.$^4$ .............................. F02C 3/28; F02C 6/18
[52] U.S. Cl. .................................. 60/39.12; 60/39.182
[58] Field of Search ............. 60/39.12, 39.182, 39.511, 60/736

[56] References Cited

U.S. PATENT DOCUMENTS 3,232,052 2/1966 Ricard ............................... 60/39.182
3,990,229 11/1976 Staege ............................... 60/39.182

FOREIGN PATENT DOCUMENTS 231558 11/1969 U.S.S.R. ............................ 60/39.182
680002 11/1952 United Kingdom ............. 60/39.182

OTHER PUBLICATIONS

Gas Turbine World, "Industrial Gas Turbine Handbook & Directory"; 1976, pp. 50, 51, 64, 65.

Primary Examiner—Louis J. Casaregola
Attorney, Agent, or Firm—Jackson & Jones

[57] ABSTRACT

A combined steam-gas-turbine power plant includes a steam turbine and a first gas turbine drivingly connected to first and second electric generators. A second gas turbine is arranged for driving a compressor supplying air to both a steam boiler and a combustor which respectively provide working fluid for the steam and gas turbine. The compressor is driven at a variable speed in accordance with the load requirements of the first and second generators. Gas turbine exhaust is used for recuperative heating of both fuel and air supplies.

27 Claims, 1 Drawing Sheet

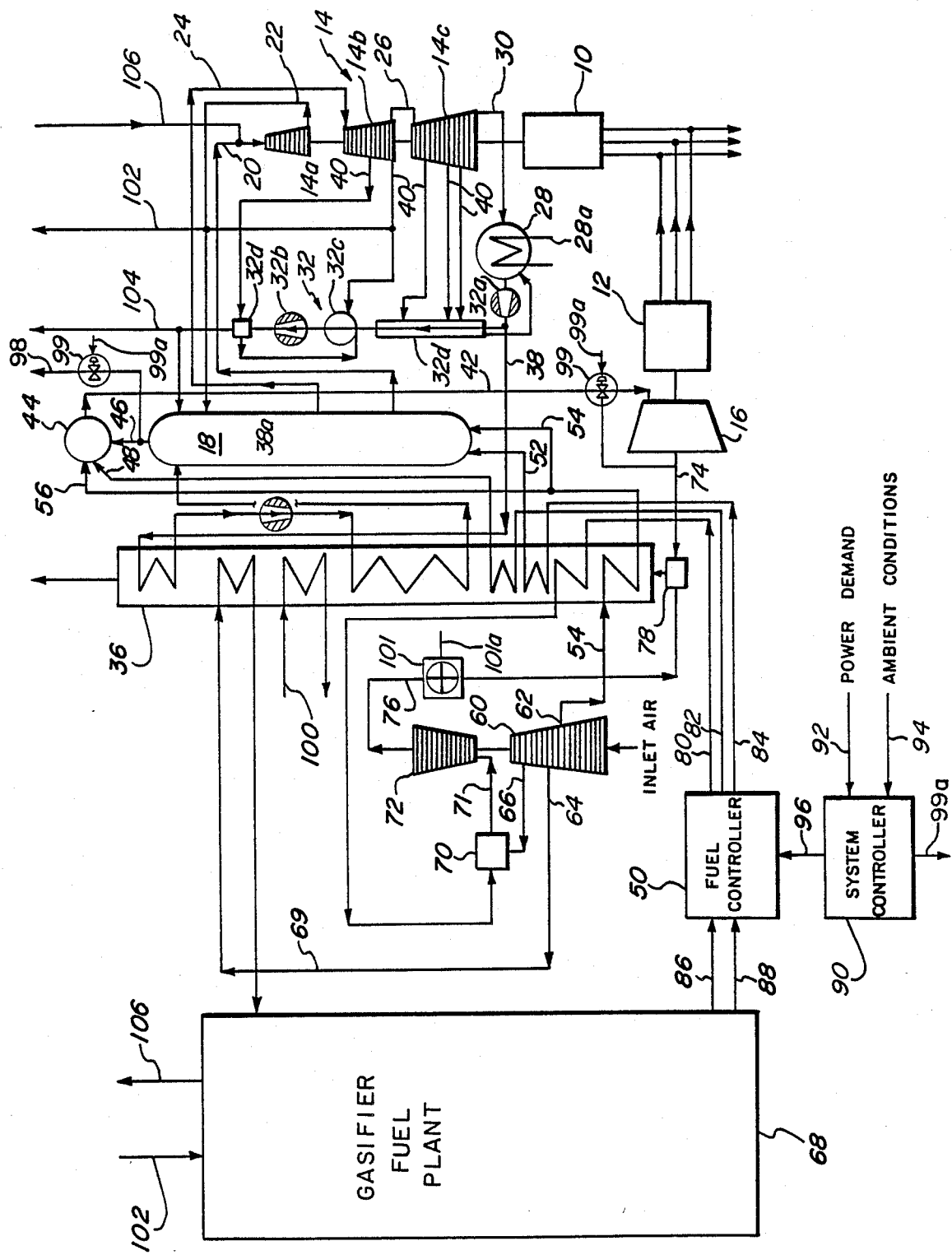

COMBINED GAS-STEAM-TURBINE POWER PLANT

BACKGROUND OF THE INVENTION

1. Field of the Invention

The present invention relates to power plants for generating electrical power and more particularly to combined gas and steam turbine plants capable of utilizing low BTU (British Thermal Unit) gas.

2. Description of the Prior Art

The abundance of coal in the United States and dwindling domestic oil reserves has created an increasing demand for the use of coal as a source of fuel for electrical power plants. While prior art power plants employing coal as the primary fuel have been in use for many years and are capable of operating with heat rates close to 9000 BTU/Kwh (kilowats hour), such plants present maintenance and particularly troublesome environmental problems.

The transformation of coal into a gaseous phase through a coal gasification process combined with a gaseous clean up process step provides a fuel which is cleaner and more readily usable than a solid coal. A combined coal gasification process and power generation plant referred to as the "Integrated Gasifier Combined Cycle ("IGCC") has recently been accepted as a standard approach for current studies of coal fueled power plants. The IGCC provides gasified coal at a high temperature to a gas turbine. Waste heat from the gas turbine is supplied to a low pressure steam turbine with the majority of the electrical energy being generated by the gas turbine. While the IGCC solves the environmental problems of conventional coal fired power plants, it has certain disadvantages.

To obtain heat rates of the order of 9000 BTU per kwh or below, combustion turbines capable of achieving a 2400° F. (Fahrenheit) firing temperature are required. However, continuous operation of commercially available power plant turbines at such high temperatures have not been adequately demonstrated. In addition, most available gasifiers require oxygen feed, operating pressures above the available gas turbine combustor pressures and large gas treating facilities (e.g. of the type used in large petrochemical plants) for providing dry, clean fuel to the gas turbine. In addition, the waste heat steam turbines are operating at low efficiencies (due to the relatively low exhaust temperatures of the gas turbines) as compared to state of the art high temperature and high pressure reheat and extraction steam turbines.

There is need for an efficient power cycle capable of utilizing the low BTU gas derived from air blown coal gasifiers.

SUMMARY OF THE INVENTION

In accordance with the present invention, a combined gas-steam-turbine power plant includes first and second electrical generators. A steam turbine and a first gas turbine (expander) are connected to the first and second generators, respectively. A high pressure boiler is connected to the steam turbine to supply superheated steam thereto. A condensor is provided for condensing the wet, two phase flow steam leaving the steam turbine and delivering boiler feed water to the boiler. A first combustor is provided for supplying gas products to the first gas turbine. An air compressor, preferably of the multiple pressure outlet type, supplies air to the pressure boiler and to the first combustor. A second gas turbine is connected to the air compressor for driving the compressor at a variable speed. Fuel supply means are provided to supply fuel, such as low BTU gas to the combustors and the pressure boiler.

The second gas turbine is arranged to drive the air compressor at a speed in accordance with the power required to be delivered to the first and second generators to meet changing ambient and load conditions.

The organization and operation of the invention may best be understood by reference to the following description taken in conjunction with the accompanying drawing.

BRIEF DESCRIPTION OF THE DRAWINGS

The drawing is a schematic illustration of a power plant in accordance with the present invention with a coal gasifier for supplying low BTU fuel thereto shown in block form.

DESCRIPTION OF THE PREFERRED EMBODIMENT

Referring now to the drawing, a pair of electrical generators 10 and 12 are driven by a multiple stage steam turbine 14 and a gas turbine or expander 16, respectively. The steam turbine 14 includes a high pressure stage 14a, a medium pressure stage 14b and a low pressure stage 14c. A pressurized boiler 18 provides superheated steam on line 20 to the inlet of the high pressure stage 14a. The outlet steam of this stage is fed back to the boiler 18 via line 22 and reheated steam is routed back to the inlet of the second stage 14b through line 24. The outlet steam of the second stage is supplied to the third stage via line 26.

A condensor 28 receives the exhausted wet steam on line 30 from the last stage 14c of the steam turbine and supplies boiler feed water to the pressure boiler through a first stage feedwater pump 32a, a deaerator 32c, a high pressure second stage feedwater pump 32b, and heat exchangers 32d and line 34. Water from the condensor outlet is also be routed through a recouperator 36 (to be described in more detail), a high pressure pump 37 and back to the boiler in the form of saturated steam via line 38. The steam turbine is preferably provided with a plurality of steam extraction outlets through which steam is supplied to the feedwater pump stages and feedwater heat exchangers 32d in line therewith via dashed lines 40 for feedwater preheating in a well-known manner. Fuel is supplied to the boiler burner (not shown) from a fuel controller 50 to be described. Air for combustion is supplied from an air compressor 60 through the recouperator 36 via line 54.

The gas turbine 16 receives gas products via line 42 from a first combustor 44 which in turn receives the exhaust gases from the boiler 18 through line 46. The combustor 44 also receives fuel from the fuel controller 50 and combustion air through lines 54 and 56 as shown. As is noted on the drawing lines 54 and 56 merge into one line (54) at the high pressure outlet 62 of the compressor 60.

The compressor 60 includes two additional outlets, 64 and 66 which provide compressed air to a gasifier 68 and a second combustor 70. The gasifier 68 is of proven design for coal derived gas and includes gas clean up units, fuel saturation section and waste heat steam sections (not shown), as is well known in the art.

The air supplied to the gasifier is routed through the recuperator via line 69 for preheating. The second combustor 70 supplies hot gas products to a second gas turbine (expander) 72 which drives the air compressor 60. The turbine (expander) 72 and air compressor 60 are preferably in the form of an integrated unit. The hot exhust gases from the first and second gas turbines (16 and 72) are supplied to the recuperator 36 through lines 74, 76 and a manifold 78.

Fuel in the form of low BTU gas is supplied from the fuel controller 50 to the first and second combustors (44 and 70) and to the boiler burner (not shown) via lines 80, 82 and 84 through the recuperator 36 for preheating. Fuel is supplied to the fuel controller 50 from the gasifier through lines 86 and 88. To increase the overall efficiency of the plant, the fuel supplied to the boiler 18 and the combustors 44 and 70 may have a high moisture content (e.g. 20–40% water by weight) to increase the mass flow; thus increasing the gas turbine power output. The utilization of the low level waste heat for fuel saturation increases the plant performance. For this purpose, one or more saturators (not shown) are included in the gasifier unit 64. For purpose of system flexibility and moisture control of the gas turbine fuels, separate saturators are preferably used for the fuel supplied to the combustor 44 and the boiler 18.

A system controller 90 is arranged to receive signals representative of the power demand and ambient conditions (i.e., temperature and humidity) at inputs 92 and 94 and to provide an output on lead 96 to the fuel controller 50. The fuel controller 50, in response to the output from the system controller, adjusts the fuel to the combustors and the pressure boiler to provide the necessary shaft horsepower to the generators 10 and 12 to meet the electrical demand taking into account the ambient conditions in a well-known manner. In addition safety hot gas venting and bypass lines 98 with necessary quick acting valves 99 (under the control of the system controller through lead 99a) may be provided in order to vent the exhaust gases from the boiler and combustor 44 to the atmosphere and the recuperator, as shown to control the spped of the gas turbine 16 in the event of a loss of the load on generator 12 etc. In case of the loss of the electrical load on generator 10, the steam turbine automatically throttles and by passes the high pressure steam to boiler feed water preheating and condensing section. The fuel controller 50 is controlled to immediately shut off the fuel to the pressurized boiler and supply fuel to the combustor 44 in accordance to the load capability of the remaining generator 12.

To further improve the efficiency of the plant, a combustor 101 may be inserted into the exhaust gas line 76 for providing complete combustion of all excess air therein thereby increasing the performance of the recuperator. Fuel may be provided to the combustor 101 from the fuel controller by line 101a.

As an example, the following pressures and temperatures may be advantageously used in the power plant of my invention:

| LOCATION IN PLANT | PRESSURE | TEMPERATURE |
| --- | --- | --- |
| Line 20 | >800 psia ("pounds/square inch absolute") preferably about 2415 psia | >800° F. and 1000–1100° F. |
| Line 24 | >500 psia preferably about 600 psia | >800° F. and 1000–1100° F. |
| Line 42 | about 70 to 150 psia preferably about 80 psia | >1500° F. and 1800° F. |
| Line 30 | about .45 psia | >10.5% moisture |
| Line 46 | about 75 to 160 psia | >750° F. |
| Line 38 | about 350 psia | |
| P.B. 18 burner output | about 70 to 160 psia preferably about 90 psia | >2400° F. and 3000° F. |
| Line 74 | about 15.2 psia | >1050° F. |
| Line 76 | about 15.2 psia | >1100° F. |
| Line 62 | >100 psia | >450° F. |
| Line 71 | >160 psia | >2000° F. |
| Line 82 | about 170 psia | and 320° F. |
| Line 80 | about 90 psia | and 215° F. |
| Line 84 | about 90 psia | and 320° F. |
| Line 69 | about 90 psia or greater | and 550° F. or greater |

The boiler 18 is preferably operated at near stable stoichmetric conditions with about ten percent excess air. The heat of combustion of the boiler 18 is to a large degree transferred to the steam turbine while the boiler combustion products are combined with fresh air (from the compressor 60) and fuel in the combustor 44 where all remaining fuel is burned. The secondary combustion products from the combustor 44 enter the first gas turbine 16 and discharge into the recuperator 36 through manifold 78. The recuperator 36 provides a respectable amount of saturated steam which is supplied to the boiler (via line 38) and superheated therein. In addition, process heat may be provided by the recuperator (via line 100) for fuel evaporators and other minor process applications in the gasifier 68.

Gasifier process steam may be extracted on line 102 from the intermediate pressure stage 14b of the steam turbine 14. The steam plant may also supply high pressure boiler feed water on line 104 for a waste heat boiler (not shown) in the gasifier 68 which, in turn, may export superheated steam on line 106 to the steam turbine 14.

With the power plant of my invention integrated with a conventional low pressure air blown kiln gas gasifier using Illinois coal fuel having a heating value of 11,241 BTU/lb., the plant heat rate will be approximately 7,876 BTU/Kwh. At full power, about 43% of the coal energy is converted to bus bar electricity while 22% is lost through the stack, 28% is rejected to the cooling water (condenser 28) and about 7% of the energy is lost in the gasification and gas treatment process.

In accordance with my invention the steam plant (boiler 18, turbine 14 and generator 10) produce the majority of the electrical energy at full load. Preferably the power split of the plant is about 62% from the steam plant and 38% from the gas turbine 16 and generator 12 with an overall performance of close to 7,900 BTU/Kwh. The high efficiency is due to the novel integration of a low pressure ratio, high efficient recuperative gas turbine power subsystem, consisting of the gas turbine driven aircompressor (72,60) and the expander or second gas turbine 16 and the high pressure steam plant with means of condensing at least 10% to 25% of moisture in the last stages of the steam turbine. In addition, this high efficiency is due in part to (1) the use of a high temperature, high pressure steam section (including means to condense at least 10% to 25% of the moisture in the last stages of the turbine) providing the majority of the output and (2) a variable speed air compressor (60) which delivers air as a function of ambient conditions and power load requirements. The use of an air compressor which is not tied to a conventional turbine driving a generator (at a fixed generator speed as in the IGCC plant) conserves power since work required to compress excess air is eliminated.

In addition the combination of the turbine 16 and the air compressor 60 operate in a high efficient recuperative mode at a low pessure ratios (e.g. 6:1) for the turbine 16, this allowing turbine operation at an optimum aerodynamic performance level. To function at a comparable effiency a conventional gas turbine would need to operate a much higher pressure ratio (e.g. >20.1), where high efficient aerodynamic turbine performance becomes more difficult.

In operation, the second gas turbine is started first to deliver pressurized and heated air to the first gas turbine. The second generator 12 is brought up to speed to start generating electrical power. With an increased power demand, the first combustor 44 is ignited, thereby providing increased temperature to the first gas turbine and increased power capability. During this phase of the operation, the boiler feed water pump 32 may circulate boiler feed wate to the recuperator and the pressure boiler 18. The pressure boiler 18 and steam turbine 14 is brought on line when the first gas turbine's design power has been achieved. The requird load schedule is achieved by control of the fuel to the second combustor 70 (which in turn controls the speed of the air compressor 60) and by control of the fuel to the boiler 19 and the first combustor 44.

The power plant may, of course, be operated with oil or other gas (e.g. natural) as a fuel. In addition the plant may be constucted in phases with the first gas turbine installed first, followed by the addition of the boiler and steam turbine as the power requirements increase. During phase one of the construction program it is also foreseen, that the gas turbine normally driving the aircompressor may be installed with a generator for peak power production.

By way of example only, the following equipment may be used in the power plant illustrated in the drawing.

Gasifier—High Temperature Winkler Gasifier or Air blown Kiln Gas Gasifier

Second Gas Turbine—as manufactured by Brown Boveri, General Electric or United Technology Process Air Compressor—as manufactured by MAN-GHH or equivalent Pressurized Boiler—as manufactured by EVT/-MAN-GHH or equivalent Steam Generator—as manufactured by MAN-GHH or equivalent First Gas Turbine—as manufactured by Brown Boveri Recuperator—as manufactured by EVT/MAN-GHH or eqivalent There has been described a novel power plant operating on a new power cycle. The plant has an increased efficiency over prior art plants (7,900 BTU/Kwh vs. 9,000 BTU/Kwh). Various modifications will be apparent to those slilled in the art without involving any departure from the spirit as scope of my invention and set forth in the appended claims.

What is claimed is:

1. In a combined Gas-Steam Turbine Power Plant for generating electricity, the combination which comprises:

first and second generators, the second generator having smaller output capacity than the first generator;

a steam turbine connected to the first generator;

a first gas turbine connected to the second generator;

a pressure boiler for supplying superheated steam to the steam turbine;

a condensor for condensing wet steam turbine exhaust and returning boiler feed water to the boiler;

a first combustor for supplying gas products to the first gas turbine;

an air compressor having an outlet for supplying air to the pressure boiler and to the first combustor;

a second gas turbine connected to the air compressor for driving the compressor at a variable speed;

a second combustor for supplying gas products to the second gas turbine;

means for supplying fuel to the first and second combustors and to the pressure boiler, the second gas turbine driving the air compressor at a speed in accordance with the power required to be delivered to the first and second generators to meet changing load conditions; and a recuperator connected between the fuel supply means and the first combustor and the pressure boiler for preheating the fuel supplied to the first combustor and pressure boiler, the recuperator receiving the combustion products from the first and second gas turbines.

2. The power plant of claim 1 wherein the recuperator is further connected between the air compressor outlet, the boiler and the first combustor for preheating the air supplied by the air compressor to the boiler and the first combustor.

3. The power plant of claim 2 wherein the recuperator is further connected between the condensor and the boiler for preheating a portion of the boiler feed water from the condensor.

4. The power plant of claim 3 wherein the recuperator is connected to the boiler for providing additional saturated steam to the boiler.

5. The power plant of claim 1 wherein the second gas turbine has an exhaust outlet and the recuperator has an inlet for receiving hot gases and further including a third combustor disposed between the outlet of the second gas turbine and the inlet of the recuperator and wherein the fuel supply means further supplies fuel to the third combustor whereby the excess air in the exhaust gases from the second gas turbine is consumed in additional combustion products.

6. The power plant of claim 1 wherein the boiler supplies superheated steam to the steam turbine having a temperature in excess of 800° F. and a pressure in excess of 200 psia.

7. The power plant of claim 6 wherein the first combustor is connected to the boiler for receiving the combustion products from the boiler.

8. The power plant of claim 7 wherein the boiler operates at near stoichiometric combustion with about ten percent excess air.

9. The power plant of claim 8 wherein the first combustor supplies gas products to the first gas turbine within a temperature range of about 1400° to 2400° F. and within a pressure range of about 60 to 160 psia.

10. The power plant of claim 9 wherein the fuel supply means supplies fuel to the boiler and first combustor which has a moisture content within the range of about 20 percent to 40 percent by weight.

11. The power plant of claim 10 wherein the first gas turbine operates with a pressure ratio of between 5 to 10.

12. The power plant of claim 11 wherein the steam turbine and first generator provide about 60-65 percent of the total electrical output and the first gas turbine and second generator produce the remainder at full load.

13. The power plant of claim 12 wherein the pressure boiler provides steam to the steam turbine at about 1000° F. and 2400 psia.

14. The power plant of claim 13 wherein the first combustor supplies gas products to the first gas turbine at about 1800° F. to 2000° F. and about 80 to 125 psi.

15. The power plant of claim 10 wherein the steam turbine includes at least high and low pessure sections and wherein the pressure boiler provides steam to the high pressure section at about 1000° F. and 2400 psia and the exhaust of the last steam turbine stage consisting of wet steam with 10 to 25% moisture content.

16. The power plant of claim 1 wherein the fuel supply means includes a coal gasifier and a fuel control means responsive to the power demand and atmospheric conditions.

17. A combined Gas-Steam-Turbine Power Plant comprising:
 (a) a high pressure boiler for producing superheated steam;
 (b) a steam turbine for receiving steam from the boiler;
 (c) a first gas turbine;
 (d) a first combustor for supplying gas products to the first gas turbine;
 (e) first and second electrical generators connected to the steam and gas turbines, respectively;
 (f) a variable speed combined gas turbine and air compressor for supplying combustion air to the boiler and first combustor;
 (g) a coal gasifier for supplying low BTU fuel;
 (h) fuel control means connected between the gasifier and the boiler and first combustor for supplying fuel thereto in accordance with demand for electrical power, the air compressor and first gas turbine functioning in a recuperative mode to provide increased efficiency at low pressure ratios for the first gas turbine; and
 (i) a recuperator for preheating the fuel and air to the first combustor and boiler.

18. The power plant of claim 17 wherein the steam turbine and associated generator supplies the majority of the output electrical energy.

19. The power plant of claim 18 wherein the steam turbine and associated generator supplies about 60 to 65% of the total electrical output.

20. The power plant of claim 19 wherein the boiler supplies steam to the steam turbine having a temperature in excess of 800° F. and at a pressure exceeding 2000 psia.

21. The power plant of claim 20 wherein the gasifier supplies fuel to the fuel control means which has a moisture content of between 20 to 40% by weight.

22. The power plant of claim 21 wherein the pressure boiler supplies steam to the steam turbine at about 1000° F. and 600 psia.

23. The power plant of claim 22 including a condensor and a feed water pump connected between the steam turbine and the boiler for returning saturated feed water under pressure to the boiler.

24. The power plant of claim 23 including means for condensing the steam from the steam turbine to provide feedwater for the boiler and means for receiving steam from the steam turbine to preheat the feedwater.

25. The power plant of claim 24 wherein the stream turbine includes a high pressure stage, an intermediate stage and a low pressure stage and wherein the boiler is arranged to provide steam to the high pressure stage at about 2400 psia and 1000° to 1100° F.

26. The power plant of claim 25 wherein the boiler provides steam to the intermediate stage of the steam turbine at about 600 psia and 1000° to 1100° F.

27. The power plant of claim 26 wherein the first combustor provides gas products to the first gas turbine at about 80 psia and 1800° F.

* * * * *

UNITED STATES PATENT AND TRADEMARK OFFICE
CERTIFICATE OF CORRECTION

PATENT NO. : 4,831,817

DATED : May 23, 1989

INVENTOR(S) : Hans D. Linhardt

It is certified that error appears in the above-identified patent and that said Letters Patent is hereby corrected as shown below:

Column 3, line 42, "spped" should read --speed--.

Column 5, line 8, "pessure" should read --pressure--.

Column 5, line 23, "wate" should read --water--.

Column 5, line 27, "requird" should read --required--.

Column 5, line 62, "slilled" should read --skilled--.

Column 7, line 7, "produce" should read --produces--.

Signed and Sealed this

Fourth Day of September, 1990

Attest:

HARRY F. MANBECK, JR.

*Attesting Officer*     *Commissioner of Patents and Trademarks*